Dec. 29, 1942.     V. L. RUPE ET AL     2,306,502
VALVE
Filed Aug. 16, 1941     4 Sheets-Sheet 1

V. L. Rupe.
C. F. Johnson.
INVENTORS.
BY
ATTORNEYS

Dec. 29, 1942.  V. L. RUPE ET AL  2,306,502
VALVE
Filed Aug. 16, 1941  4 Sheets-Sheet 2

V. L. Rupe.
C. F. Johnson.
INVENTORS.

BY
ATTORNEYS

Dec. 29, 1942.    V. L. RUPE ET AL    2,306,502
VALVE
Filed Aug. 16, 1941    4 Sheets-Sheet 3

V. L. Rupe.
C. F. Johnson
INVENTORS.
BY J. Vincent Martin
and
Ralph R. Browning
ATTORNEYS Dec. 29, 1942.  V. L. RUPE ET AL  2,306,502
VALVE
Filed Aug. 16, 1941  4 Sheets-Sheet 4

V. L. Rupe
C. F. Johnson
INVENTORS.

BY
ATTORNEYS.

Patented Dec. 29, 1942

2,306,502

UNITED STATES PATENT OFFICE 2,306,502

VALVE

Victor L. Rupe and Charles F. Johnson, Houston, Tex., assignors to Reed Roller Bit Company, Houston, Tex., a corporation of Texas Application August 16, 1941, Serial No. 407,174

5 Claims. (Cl. 251—102)

This invention relates in general to valves for use in lines carrying fluids under high pressures and more particularly has reference to so-called modified plug type valves.

One form of modified plug type valve has been devised in which the valve shell or body is provided with a cylindrical bore and a carrier is mounted co-axially therein and carries segmental closure members more or less loosely. Lugs are provided on the segmental closure members and hooks are provided on the carrier for engaging the lugs to shift the closure members to and from valve closing position. In this particular form of valve cooperating, cam-like surfaces are provided on the lugs and carrier hooks to displace trailing edges of the segmental closure members radially inwardly from their closing positions, prior to displacing the closure members circumferentially away from the flow ports. This particular form of valve has been found desirable but due to the fact that the "trailing edges" of the segmental closure member only is lifted from its seat, there is a tendency for the leading edge of the segmental closure member to "dig in" its seat.

In valves of this type wherein the seats are of metal hard enough to resist penetration of the leading edge of the closure member this may not even be a difficulty because under certain circumstances it is desirable that the leading edge of the closure member scrape clean the walls of the valve chamber. However, in valves of this form wherein the valve seats are of soft material as is many times necessary or desirable, this scraping of the leading edge of the closure member becomes a grave difficulty.

An object of this invention is to provide a valve structure of the type above described which is free of the disadvantages inherent therein.

Another object of this invention is to provide a valve having a floating closure member adapted to be first broken away from its seat and then displaced over its seat in which the leading edge of the closure member is broken away from its seat as distinct from the prior art construction wherein the trailing edge is first broken away from the seat.

A further object of this invention is to provide a valve having a floating closure member adapted to be first broken away from its seat and then to be displaced over its seat in which the closure member is first displaced from its seat and then moved over its seat in a manner to avoid the leading edge of the closure member engaging the seat.

Other objects will appear from the following description and from the accompanying drawings showing an embodiment of the invention.

Figure 1:
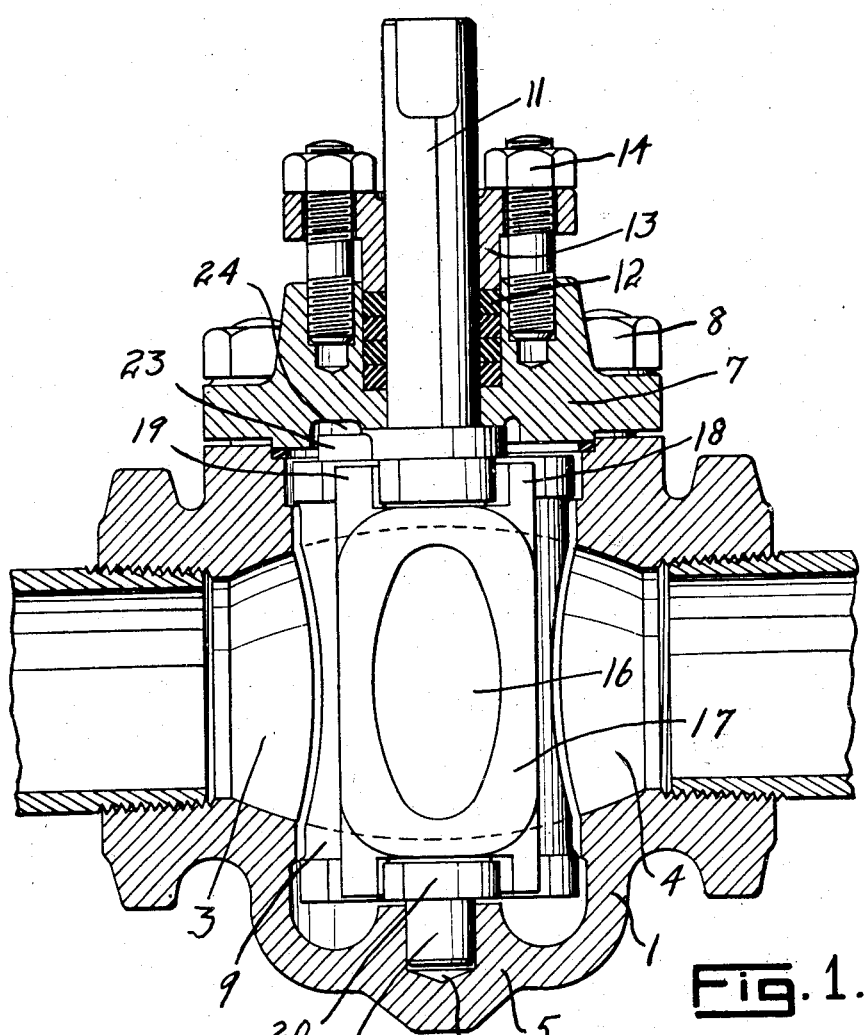
Fig. 1 is an axial sectional view of a valve constructed in accordance with the present invention shown in open position.
Figure 2:
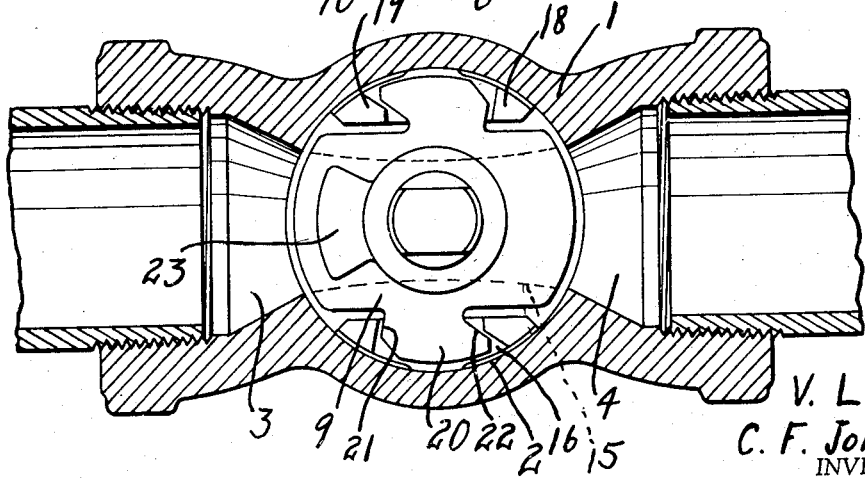
Fig. 2 is another sectional view of the valve taken on a plane perpendicular to the axis of the valve stem.
Figure 3:
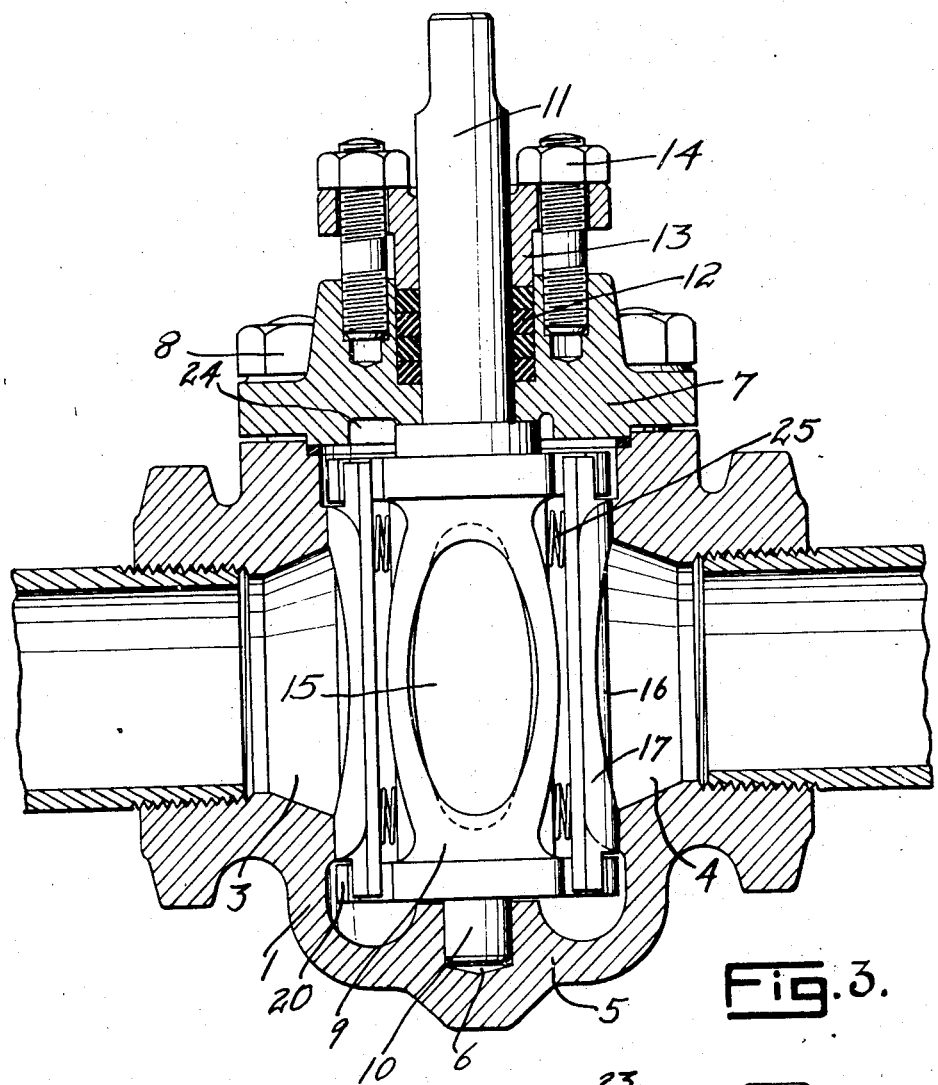
Fig. 3 is a view like Fig. 1 showing the valve in closed position.
Figure 4:
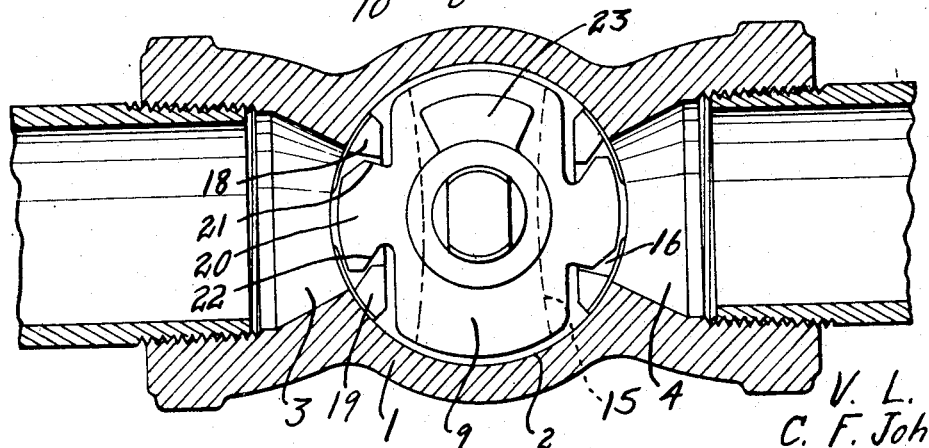
Fig. 4 is a view like Fig. 2 showing the valve in closed position.
Figure 5:
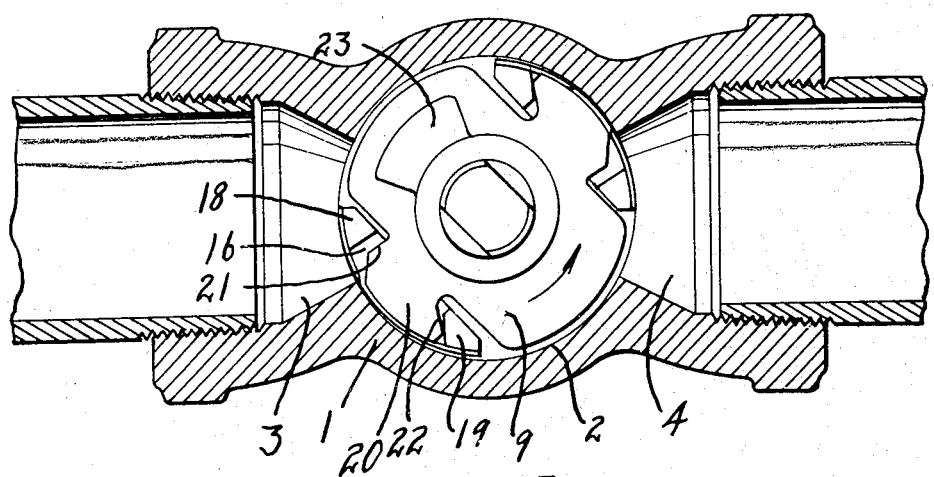
Fig. 5 is a view similar to Fig. 2 with the valve in a position with the closure members partly removed from their seats during its opening movement.

As shown in Figs. 1 to 6 of the drawings, the valve of this invention comprises a valve body 1 having a cylindrical bore 2 therein forming a valve chamber. Openings or ports 3 and 4 are provided in the valve body for the inflow or outflow of fluid into and out of the chamber 2. Either port may be in the inflow or outflow port, the direction of flow of fluid through the valve being immaterial.

One end of the cylindrical bore 2 has a closure 5 which is shown as being integral with the body 1, but which may be a separate element secured to the body 1. Closure 5 has a central recess 6 which serves as a bearing for the valve closure carrier which will be described hereinafter.

The other end of the cylindrical bore 2 is closed by a cover or bonnet 7 which is detachably secured to the valve body 1 by screws 8 or other suitable means. Bonnet 7 has an opening in the central portion thereof which serves as a bearing for the valve closure carrier.

Within the cylindrical bore 2 the carrier 9 is mounted for rotation about its axis. For this purpose, the carrier 9 has a pin shaft 10 mounted in the bearing 6 and an actuating stem 11 extending through the opening in the bonnet 7. A stuffing box or gland is provided in the bonnet 7 and is filled with packing material 12 which is compressed by the plunger 13 which is displaced by the screws 14. With this construction and the bonnet sealed to the body 1 by a suitable gasket, a tight leak-proof device is ensured.

The closure carrier 9 comprises a body having a passage or flow opening 15 extending transversely therethrough and adapted to be brought into register with the ports 3 and 4 to permit free unrestricted flow through the valve. On each side of the passage 15 of the body 9 is flattened to provide a space between the body of carrier 9 and the wall of the cylindrical bore for the segmental closure members 16. These segmental closure members have seating surfaces 17 on their outer portions adapted to engage the wall of the cylindrical bore 2 about the ports 3 and 4. The surface 17 may be metal or may be of softer material to ensure a tight seal between the closure members 16 and the wall of bore 2 even when fluid containing grit or sediment is flowed through the valve. In this connection, replaceable seats (not shown) of sealing material may be used.

At the upper and lower ends of the segmental closure members, as viewed in Fig. 1, projections 18 and 19 are provided one adjacent one side edge of the segment 16 and one adjacent the other side edge.

As clearly shown in Figs. 2, 4, 5 and 6, the projections or lugs 18 are of a shape different from that of projections or lugs 19. On each side of the closure carrier 9 adjacent the upper and lower ends thereof, lateral projecting ears 20 are provided which extend between the lugs 18 and 19 of the segmental closure members. At this point, it should be noted that the ears 20 have a surface 21 adapted to abut the lugs 18 of the segmental closure members to transmit a purely circumferential force from the carrier ears 20 to said lugs 18. On the other hand, the ears 20 have a hook-like portion having an inclined or cam surface 22 adapted to engage a similar inclined or cam surface on the lugs 19 to cause said lugs 19 to slide over the cam surface 22 and draw the closure member away from its seat.

Figure 6:
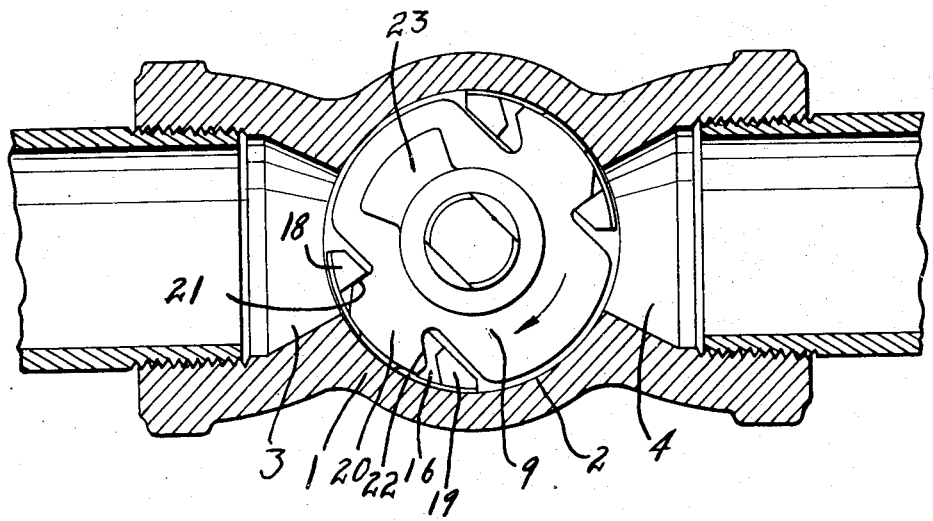
Fig. 6 is a view like Fig. 5 but with the valve in the course of its closing movement.

In operation, the carrier 9 is rotated through an angle of about 90° to and from open and closed positions. A stop 23 is mounted on the stem 11 and moves in a sector-like recess 24 in the bonnet 7 to limit the rotation of the carrier 9. It is rotated from open position (Fig. 2) to closed position (Fig. 4) by engagement of ears 20 with lugs 18 as indicated in Fig. 6. This transmits a purely circumferential force from ears 20 to lugs 18. After the valve is closed, the pressure of the fluid will force one of the closure members 16 onto its seat and considerable force exerted circumferentially would be required to break the seal and initiate opening movement. According to the present invention, however, the cam surfaces 22 of ears 20 will engage the corresponding cam surfaces of lugs 19 and cause said lugs 19 to first be displaced radially toward the center of the bore 2 to break the leading edge or edge adjacent lugs 19 away from the surface of bore 2. When this leading edge has been moved away from the surface of bore 2 the members 16 may be displaced in the direction of the arrow in Fig. 5 to an open position (Fig. 2) with about the same force as was needed to move them to the closed position. By lifting the leading edges of the segmental members 16, they may be displaced in the manner of a drawn sled without the leading edges digging into the surface of bore 2.

Springs 25 (Fig. 3) are provided for urging the segmental closure members 16 against the wall of bore 2.

Figure 7:
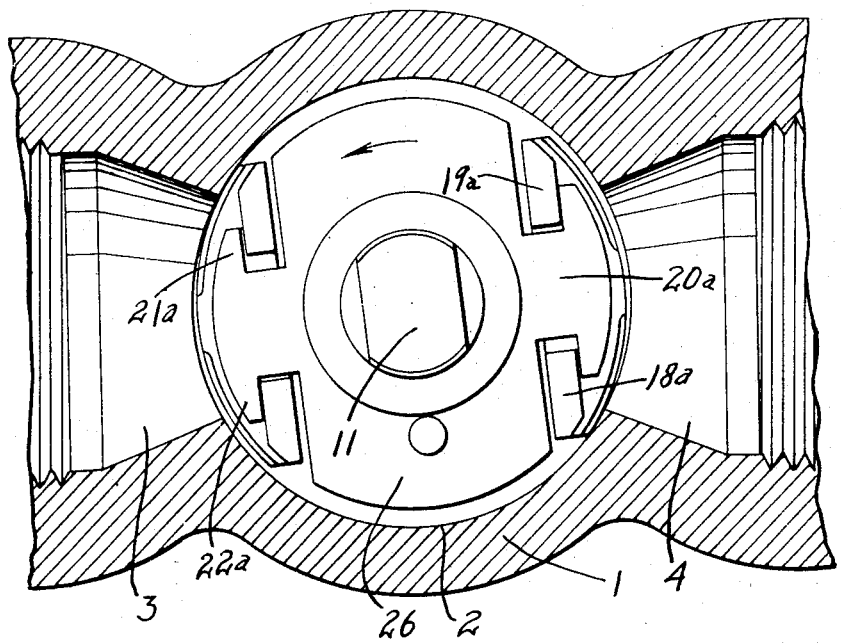
Fig. 7 is a view similar to Fig. 5 but illustrating a modified form and showing the valve parts in the positions which they occupy during the opening movement of the valve.
Figure 8:
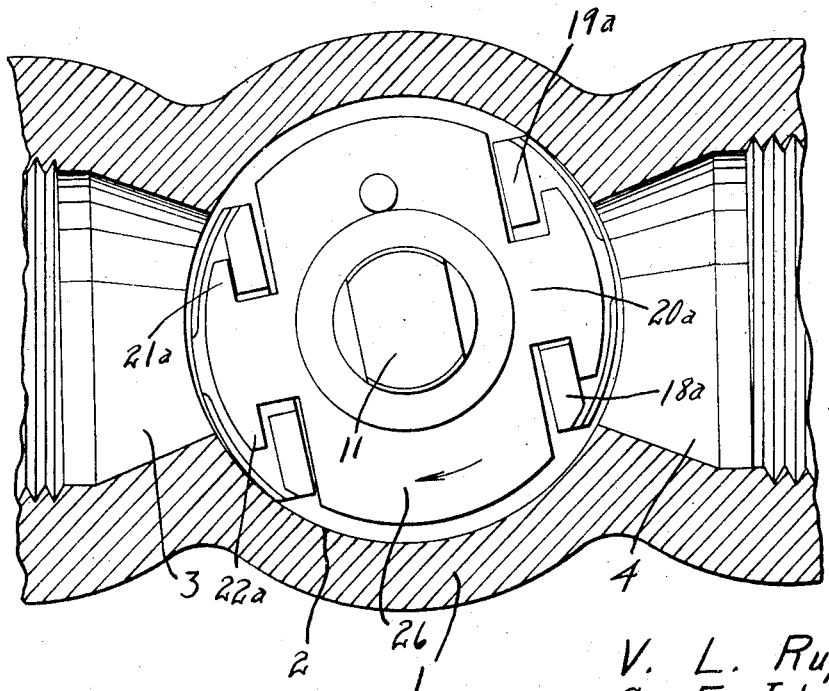
Fig. 8 is a view similar to Fig. 7 but showing the same valve during the closing movement thereof.

With reference to the form of the invention shown in Figs. 7 and 8, it will be seen that there is set forth a structure in which the leading edge of each closure member will be lifted on the closing as well as on the opening movement of the valve. In this form the construction is substantially the same as in the form heretofore described except that the lugs 20—a at the upper and lower ends of the carrier are of T-shape having two oppositely projecting hook-shaped portions 21—a and 22—a. These overlie the projections 18—a and 19—a on the closure members and it is noted that the lugs 18—a and 19—a are in this form identical. For the purpose of assembly, the upper flange 26 on the carrier is made removable. The closure members are put in position on the carrier with the lugs 18—a and 19—a straddling the narrow portions of the projections or ears 20—a on the lower flange of the carrier, and the upper flange of the carrier is then slipped into place so that its ears 20—a occupy positions between the lugs 18—a and 19—a at the upper ends of the closure members. This upper flange of the carrier is, of course, provided with a non-rotatable connection with the carrier so that when the carrier rotates the upper flange will also rotate.

In operation it will clearly be seen that a rotation such as illustrated in Fig. 7 in a direction to open the valve will cause one hook-shaped extremity 22—a of each of the ears 20—a to engage the lugs 19—a respectively and thus first lift then rotate the closure members. The same action in reverse takes place when the carrier is rotated in a direction to close the valve as is illustrated in Fig. 8. Thus, it will be seen that in this case the hook-shaped parts 21—a of the ears 20—a will engage the lugs 18—a on the closure members respectively and cause first the raising of the leading edges thereof and then the rotation thereof.

From the foregoing description, it will be realized that we have provided a very practical useful construction which completely avoids the disadvantages of the prior valves of similar type.

Having described our invention, we claim:

1. A valve comprising a valve body having a cylindrical chamber therein and ports communicating with said chamber, a carrier rotatably mounted in said chamber co-axially thereof and extending axially from one end of the chamber to the other, segmental closure members positioned in said chamber for circumferential movement to and from positions to close said ports and for radial movement away from the wall of said chamber, a pair of axially extending lugs on each end of each closure, one lug being adjacent one side edge of the closures and the other lug being adjacent the other side edge of the closures at each end thereof, projections on the carrier at the ends thereof extending radially between the lugs of each pair and engaging the lugs adjacent one side edge of each closure to displace the closures to port closing positions and to engage the lugs adjacent the other side edge of the closures to displace the closures from closed to open positions, the lugs adjacent the side edges of the closures which will be the leading edges during movement from closed to open positions having cam surfaces adapted to cooperate with the projections on the carrier to raise said leading edges of the closures from their seats at the beginning of movement of said closures from closed to open positions.

2. A valve comprising a valve body having a ported valve chamber, a closure member in said chamber for closing said port, a rotatable carrier in said chamber, said carrier extending axially of the chamber from one end thereof to the other, a pair of lugs extending axially from each end of said closure toward the ends of the chamber, a projection on the carrier adjacent each end thereof and extending radially between the pair of lugs on the corresponding ends of the closure, the projections adjacent both ends of the carrier being positioned for simultaneous engagement with one lug of each pair for moving the closure to port closing position and adapted to engage the other lug of each pair for moving the closure from port closing to an open position, and cooperating means on each of said lugs and on the projection, for raising the edge which forms the leading edge in the movement of the closure in either direction, prior to moving of said closure.

3. A valve comprising a valve body having a ported valve chamber, a closure member in said chamber for closing said port, a rotatable carrier in said chamber, said carrier extending axially of the chamber from one end thereof to the other, a pair of axially extending lugs on each end of said closure toward the ends of the chamber, one lug being adjacent one side edge of the closure and the other lug being adjacent the other side edge of the closure, a T-shaped projection carried by the carrier adjacent each end thereof and having stem portions extending radially therefrom between the pairs of lugs on the corresponding ends of the closure for engaging the lugs adjacent one side of the closure to displace the closure to a port closing position and to engage the lugs adjacent the other side of the closure to displace the closure to an open position, said T-shaped projections on the carrier having flange portions located radially outwardly of said lugs adapted to cooperate with said lugs respectively to raise from its seat at the beginning of movement of the closure in either direction that edge of the closure which is to form the leading edge during such movement.

4. A valve comprising a valve body having a cylindrical chamber therein and ports communicating with said chamber, a carrier rotatably mounted in said chamber coaxially thereof and extending axially from one end of the chamber to the other, segmental closure members in said chamber for circumferential movement to and from positions to close said ports and for radial movement away from the wall of said chamber, a pair of axially extending lugs on each end of each closure, one lug of each pair being adjacent to one side edge of the closures and the other lug being adjacent the other side edge of the closure at each end thereof, projections on the carrier at the ends thereof having portions extending radially between the pairs of lugs at each end of the closure members to engage the lugs adjacent one side edge of each closure to displace the closure to port closing position and to engage the lugs adjacent the other side edge of the closure to displace the closures from closed to open positions, the lugs adjacent the side edges of the closures which will be the leading edges during movement from closed to open positions having cam surfaces adapted to cooperate with the projections on the carrier to raise said leading edges of the closures from their seats at the beginning of movement of said closures from closed to open positions, and the lugs adjacent the side edges of the closures which will be the leading edges during movement from open to closed positions having cam surfaces adapted to cooperate with the projections on the carrier to raise said leading edges of the closures from their seats at the beginning of movement of said closures from open to closed positions.

5. A valve comprising a valve body having a ported valve chamber, a closure member in said chamber for closing said port, a carrier movably mounted in said chamber for movement to and from positions to close said port, said carrier extending transversely of its direction of movement from one end of the chamber over the port toward the other end of the chamber, a pair of lugs on each end of said closure projecting therefrom toward the corresponding ends of the chamber and lying in close proximity to the corresponding ends of the carrier, one lug being adjacent one side edge of the closure and the other lug being adjacent the other side edge of the closure, a projection on each end of the carrier and extending laterally to positions between the pair of lugs on the corresponding ends of the closure and engaging the lugs adjacent one side of the closure to displace the closure to a port closing position and to engage the lugs adjacent the other side of the closure to displace the closure to an open position, the lugs adjacent the side edge of the closure which will be the leading edge during movement from a closed to an open position having cam surfaces adapted to cooperate with the projection on the carrier to raise said side edge of the closure from its seat at the beginning of movement of said closure from closed to open position.

VICTOR L. RUPE.
CHARLES F. JOHNSON.